United States Patent
Nohara et al.

(10) Patent No.: US 11,328,464 B2
(45) Date of Patent: May 10, 2022

(54) VEHICULAR DISPLAY APPARATUS

(71) Applicant: DENSO CORPORATION, Kariya (JP)

(72) Inventors: Masafumi Nohara, Kariya (JP); Yoshio Oofuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/747,914

(22) Filed: Jan. 21, 2020

(65) Prior Publication Data

US 2020/0160576 A1 May 21, 2020

Related U.S. Application Data

(63) Continuation of application No. PCT/JP2018/024258, filed on Jun. 27, 2018.

(30) Foreign Application Priority Data

Jul. 25, 2017 (JP) .............................. JP2017-143908

(51) Int. Cl.
*G06T 11/60* (2006.01)

(52) U.S. Cl.
CPC ................................... *G06T 11/60* (2013.01)

(58) Field of Classification Search
None
See application file for complete search history.

(56) References Cited

U.S. PATENT DOCUMENTS

| | | | | |
|---|---|---|---|---|
| 2005/0280521 A1* | 12/2005 | Mizumaki | ............ | B60K 35/00 340/438 |
| 2007/0139408 A1* | 6/2007 | Keranen | ................ | G06T 15/50 345/426 |
| 2008/0238913 A1 | 10/2008 | Katoh et al. | | |
| 2016/0096432 A1* | 4/2016 | Kobayashi | ............... | G01D 7/02 340/461 |
| 2016/0236570 A1 | 8/2016 | Wakatsuki | | |
| 2016/0358592 A1* | 12/2016 | Rogoyski | ................ | G09G 5/40 |
| 2017/0200433 A1 | 7/2017 | Yamamoto | | |

FOREIGN PATENT DOCUMENTS

| | | |
|---|---|---|
| DE | 112014006991 T5 | 6/2017 |
| DE | 112014002934 B4 | 3/2020 |
| JP | 2009015284 A | 1/2009 |
| JP | 2016549881 A | 9/2014 |
| JP | 2015105946 A | 6/2015 |
| WO | WO-2019/017198 A1 | 1/2019 |

* cited by examiner

*Primary Examiner* — Aaron M Richer
(74) *Attorney, Agent, or Firm* — Harness, Dickey & Pierce, P.L.C.

(57) ABSTRACT

A vehicular display apparatus is provided. The apparatus acquires image data of a display target object. The apparatus arranges the display target object in a virtual space based on the image data, arranges a virtual light source and a virtual viewpoint in the virtual space, and generates, as the display image, an image of the display target object viewed from the virtual viewpoint, and displays the display image with a display unit. The display target object includes an instrument with a needle and a shiny dial. The apparatus generates the display image through setting an area on the display target object as a reflection area and setting reflectance of a reflection suppression area smaller than reflectance set for the dial, where the reflection suppression area is a partial area of the dial and is set to cover places overlapping with the needle.

7 Claims, 7 Drawing Sheets

VEHICULAR DISPLAY APPARATUS

CROSS-REFERENCE TO RELATED APPLICATIONS

The present application is a continuation application of International Patent Application No. PCT/JP2018/024258 filed on Jun. 27, 2018, which designated the U.S. and claims the benefit of priority from Japanese Patent Application No. 2017-143908 filed on Jul. 25, 2017. The entire disclosures of all of the above applications are incorporated herein by reference.

TECHNICAL FIELD

The present disclosure relates to a vehicular display apparatus that displays an image with a display unit installed in a vehicle.

BACKGROUND

An apparatus for displaying various images with a display unit installed in a vehicle is known. Some apparatuses arrange a virtual instrument in a virtual space, and display with the display unit an image of the virtual instrument viewed from a virtual viewpoint.

When an instrument is actually exposed to sunlight or other light, its dial portion may be also exposed to the light. In view of this, in order to make the depiction closer to the real thing, it is conceivable to depict the light reflection on the dial portion also. However, when the light reflection is depicted on the dial portion, there is a possibility that the vicinity of a needle becomes too bright and it is difficult to see the value pointed to by the needle.

SUMMARY

The present disclosure provides a vehicular display apparatus.

A vehicular display apparatus in a first aspect of the present disclosure acquires image data of a display target object for generating a display image displayed with a display unit. The display target object includes an instrument with a needle and a shiny dial. The vehicular display apparatus generates the display image through: setting an area on the display target object as a reflection area depicting reflection resulting from light illumination; and setting reflectance of a reflection suppression area smaller than reflectance set for the dial, wherein the reflection suppression area is a partial area of the dial and is set to cover places overlapping with the needle. The vehicular display apparatus displays the display image with the display unit.

A vehicular display apparatus in a second aspect of the present disclosure acquires image data of a display target object for generating a display image displayed with a display unit. The display target object includes an instrument with a needle and a shiny dial. The vehicular display apparatus generates the display image through setting an area on the display target object as a reflection area depicting reflection resulting from light illumination. The vehicular display apparatus sets the reflection area to a position displaced from a needle vicinity area that is set to the dial so as to cover places overlapping with the needle. The vehicular display apparatus displays the display image with the display unit.

BRIEF DESCRIPTION OF DRAWINGS

Objects, features and advantages of the present disclosure will become more apparent from the following detailed description made with reference to the accompanying drawings.

DETAILED DESCRIPTION

Figure 1:
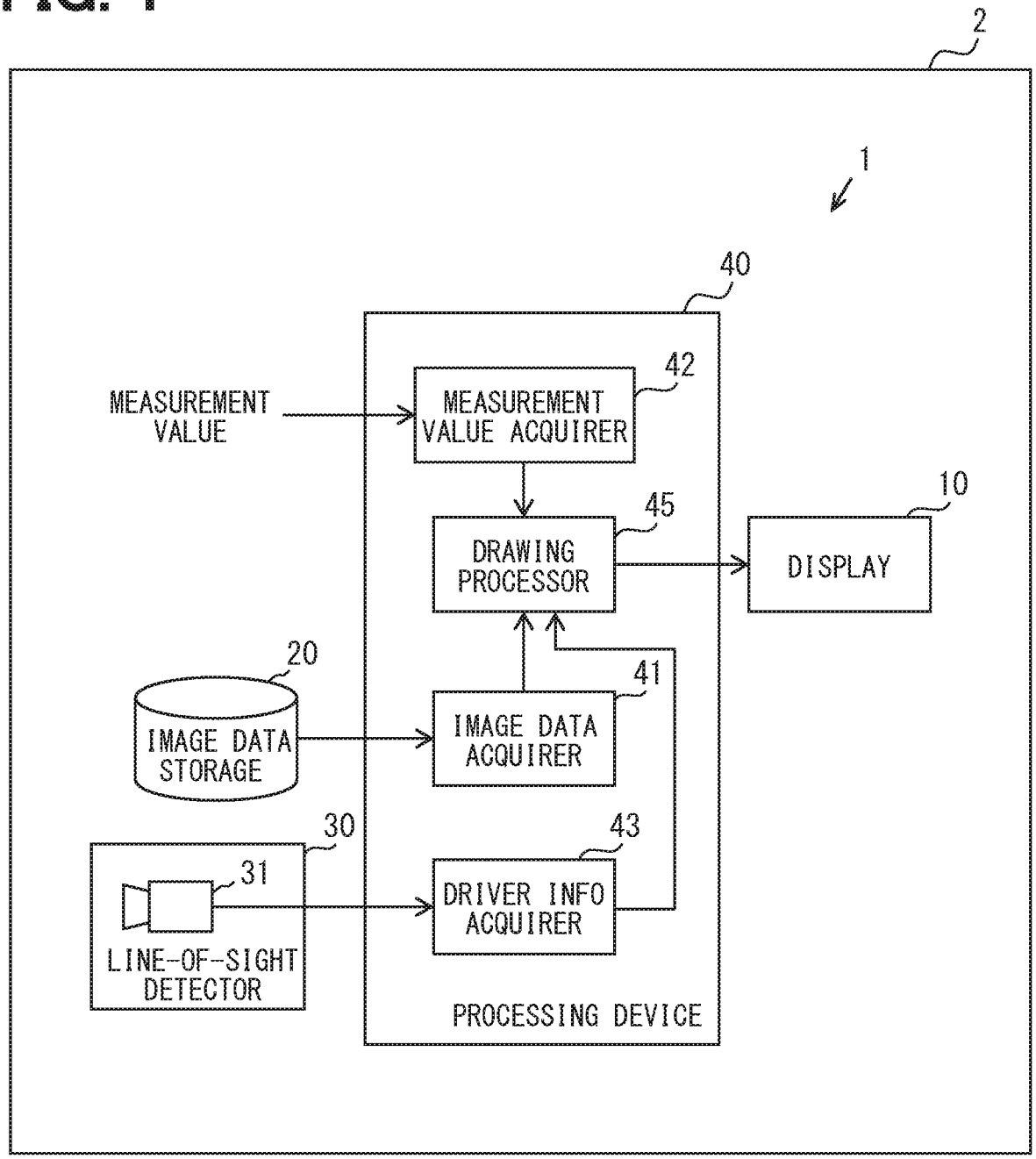
FIG. 1 is a block diagram illustrating a configuration of a vehicular display apparatus of a first embodiment.

There is an apparatus that arranges a virtual instrument in a virtual space, and displays with a vehicle-installed display unit an image of the virtual instrument viewed from a virtual viewpoint. In order to increase the reproducibility of the texture of the instrument, the apparatus arranges a virtual light source in the virtual space and illuminates the instrument with virtual light from the virtual light source. Additionally, the apparatus highlights a virtual-light-illuminated portion of a ring of the instrument in order to depict the light reflection.

When an instrument is actually exposed to sunlight or other light, its dial portion may be also exposed to the light. In view of this, in order to make the depiction closer to the real thing, it is conceivable to depict the light reflection on the dial portion also. However, when the light reflection is depicted on the dial portion, there is a possibility that the vicinity of a needle becomes too bright and it is difficult to see the value pointed to by the needle.

It is an object of some embodiments of the present disclosure to provide a vehicular display apparatus that, while depicting light reflection also on a dial portion of an instrument displayed with a display unit, can suppress unreadability of a value pointed to by a needle.

A vehicular display apparatus in some embodiments of the present disclosure comprises a display unit, an image data acquirer, and a drawing processor. The display unit is installed in a vehicle. The image data acquirer acquires image data of a display target object for generating a display image displayed with the display unit. The drawing processor arranges the display target object in a virtual space based on the image data acquired by the image data acquirer, arranges a virtual light source and a virtual viewpoint in the virtual space, and generates, as the display image, an image of the display target object viewed from the virtual viewpoint, and displays the display image with the display unit.

The display target object includes an instrument with a needle and a shiny dial. The drawing processor generates the display image through: setting an area on the display target object determined based on the virtual light source and the virtual viewpoint, as a reflection area depicting reflection resulting from light illumination; and setting reflectance of a reflection suppression area smaller than reflectance set for the dial, wherein the reflection suppression area is a partial area of the dial and is set to cover places overlapping with the needle.

In this vehicular display apparatus, the drawing processor generates the display image through setting the reflection area depicting the reflection resulting from the light illumination. This reflection area is the area on the display target object determined based on the virtual light source and the virtual viewpoint, and the display target object includes the instrument with the needle and the shiny dial. In the above, a dial portion of the instrument is not excluded from the reflection area. Therefore, depending on the positions of the virtual light source and the virtual viewpoint, the light reflection is depicted on the dial portion of the instrument also.

In the above, with regard to the reflection suppression area which is the partial area of the dial and which is set to cover the places overlapping with the needle, the drawing processor generates the display image through setting the reflectance of the reflection suppression area smaller than the reflectance set for the dial, even in cases where the reflection suppression area is in the reflection area. Therefore, it is possible to suppress unreadability of the value pointed to by the needle.

A vehicular display apparatus in another embodiment of the present disclosure comprises a display unit, an image data acquirer, and a drawing processor. The display unit is installed in a vehicle. The image data acquirer acquires image data of a display target object for generating a display image displayed with the display unit. The drawing processor arranges the display target object in a virtual space based on the image data acquired by the image data acquirer, arranges a virtual light source and a virtual viewpoint in the virtual space, generates, as the display image, an image of the display target object viewed from the virtual viewpoint, and displays the display image with the display unit.

The display target object includes an instrument with a needle and a shiny dial. The drawing processor generates the display image through setting an area on the display target object determined based on the virtual light source and the virtual viewpoint, as a reflection area depicting reflection resulting from light illumination. When the reflection area overlaps at least in part with a needle vicinity area that is set to the dial so as to cover places overlapping with the needle, the drawing processor sets the reflection area to a position displaced from the needle vicinity area.

In this vehicular display device, the drawing processor generates the display image through setting the reflection area which depicts the reflection resulting from the light illumination. This reflection area is an area on the display target object determined based on the virtual light source and the virtual viewpoint, and the display target object includes the instrument with the needle and the shiny dial, and the dial portion is not excluded from the reflection area. Therefore, depending on the positions of the virtual light source and the virtual viewpoint, the light reflection is also depicted on the dial portion of the instrument. In that regard, when the reflection area overlaps at least in part with the needle vicinity area, the drawing processor sets the reflection area to the position displaced from the needle vicinity area. Therefore, it is possible to suppress unreadability of the value pointed to by the needle.

Hereinafter, embodiments will be specifically described with reference to the drawings.

First Embodiment

FIG. 1 illustrates a configuration of a vehicular display apparatus 1 according to a first embodiment. The vehicular display apparatus 1 is mounted to a vehicle 2. The vehicular display apparatus 1 includes a display 10, an image data storage 20, a line-of-sight detector 30, and a processing device 40.

The display 10 corresponding to a display unit is installed to an instrument panel of the vehicle 2 and displays a variety of information regarding the vehicle 2. The information is displayed as an image. Hereinafter, an image displayed with the display 10 is referred to as a display image.

The image data storage 20 stores data (hereinafter referred to as image data) for generating various display images displayed with the display 10. The display images include an image that is displayed three-dimensionally. For the three-dimensionally displayed image, three-dimensional shape data is stored as the image data. In addition to the shape data, reflectance of an object surface is also set in the image data for an image required to provide a visual representation of the reflection. In cases where the reflection is depicted with Phong reflection model, specular reflectance, diffuse reflectance, and ambient reflectance are set as the reflectance according to material. Also, shininess of the material is set.

Figure 2:
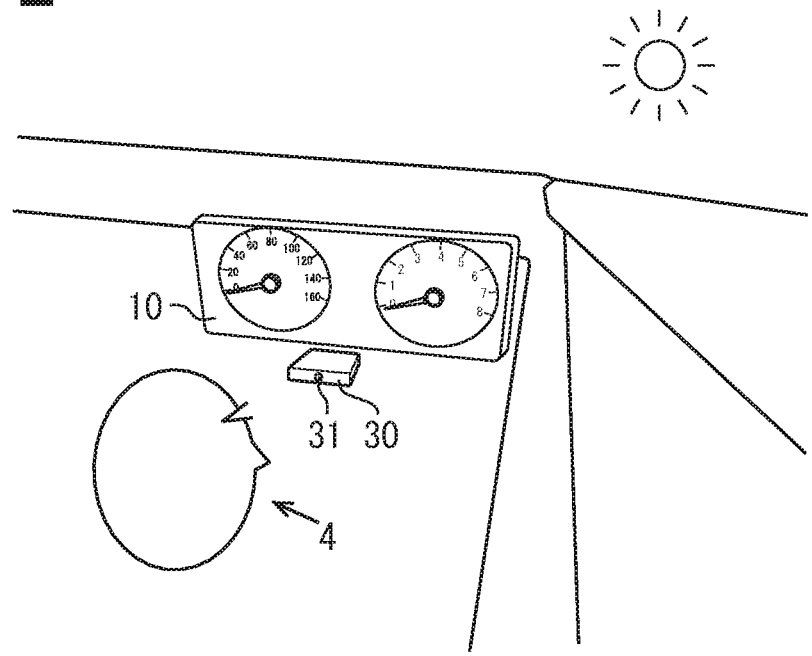
FIG. 2 is a diagram showing an example of installation of a line-of-sight detector.

The line-of-sight detector 30 detects a driver's viewpoint and a driver's line-of-sight direction. For detecting these, the line-of-sight detector 30 includes a camera 31. FIG. 2 shows an example of installation of the line-of-sight detector 30. In the example of FIG. 2, the line-of-sight detector 30 is disposed below the display 10. An imaging range of the camera 31 included in the line-of-sight detector 30 is set so that the imaging range covers the driver's head 4. The installation position of the line-of-sight detector 30 is not limited to the position illustrated in FIG. 2, and may be installed at a position other than the position illustrated in FIG. 2 as long as the driver's head 4 can be imaged.

The line-of-sight detector 30 analyzes the image captured by the camera 31 and detects the positions of the driver's eyes. More specifically, the positions of the reference point of the eye and the position of the moving point of the eye are detected. There is known a method of detecting a line of sight based on a positional relationship between an eye reference point and an eye moving point, where the eye reference point is an inner corner of the eye and the eye moving point is an iris of the eye. There is also known a method in which the eye reference point is a cornea reflection and the eye moving point is a pupil, and the light-of-sight is detected based on a positional relationship between these.

The processing device 40 is a computer including a CPU, a RAM, a ROM, I/O, and a bus line connecting these components. The ROM stores a program to be executed by the CPU. It is noted that as long as this program is stored in a non-transitory tangible storage medium, the storage medium is not limited to the ROM. For example, the program may be stored in a flash memory. Executing the program by the CPU corresponds to executing a method corresponding to the program.

As shown in FIG. 1, by the CPU executing a program stored in the ROM, the processing device 40 implements functions of an image data acquirer 41, a measurement value acquirer 42, a driver information acquirer 43, and a drawing processor 45. Alternatively, part or all of the functional blocks of the processing device 40 may be implemented using one or more ICs (in other words, using hardware). Alternatively, part or all of the functional blocks of the processing device 40 may be implemented using a combination of the CPU executing software and a hardware component.

Figure 3:
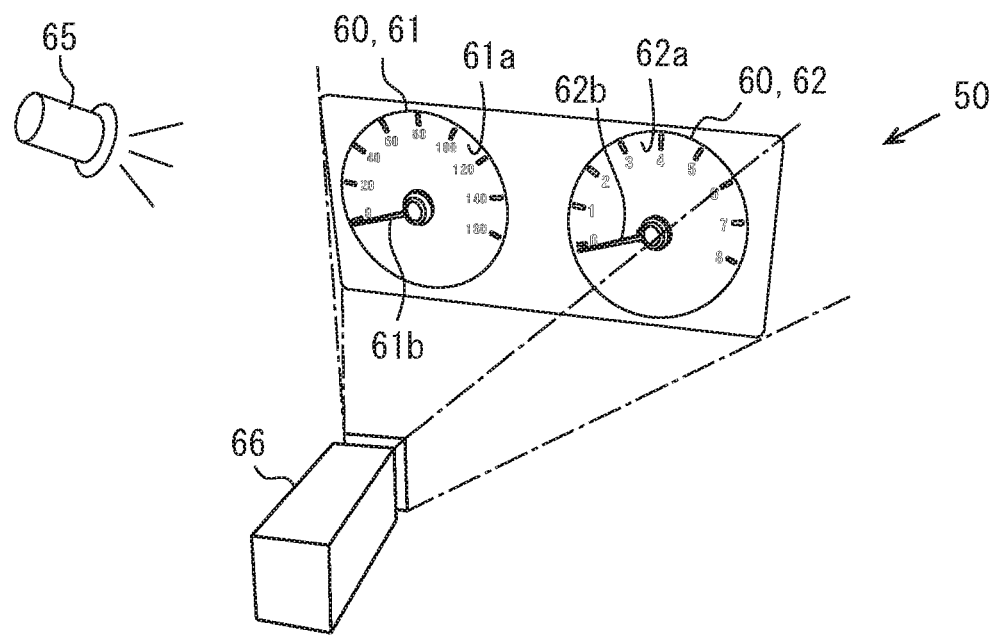
FIG. 3 is a diagram illustrating a state where display target objects are arranged in a virtual space.

The image data acquirer 41 acquires the image data from the image data storage 20. FIG. 3 illustrates a state where the display target objects 60 are arranged in a virtual space 50. The image data acquirer 41 acquires image data of the display target objects 60.

In the present embodiment, images of the display target objects arranged in the virtual space 50 and viewed from a virtual viewpoint are displayed as the display image with the display unit 10. That is, these display target objects 60 are objects for being displayed with the display 10. The display target objects 60 shown in FIG. 3 are specifically a speedometer 61 and a tachometer 62. These are examples, and the display target objects 60 may include an object other than those shown in FIG. 3. For example, various instruments such as a fuel gauge and a water temperature gauge may be included in the display target objects 60.

The speedometer 61 is provided with a dial 61a and a needle 61b. The tachometer 62 is provided with a dial 62a and a needle 62b. The dial 61a, 62a has a circular flat plate shape. The dial 61a, 62a of the present embodiment has metallic luster. In other words, the specular reflectance is set to the surfaces of these dials 61a and 62a so as to exhibit metallic luster. The surface of the dial 61a, 62a may be provided with nanoscale irregularities in a rotation direction in order to exhibit hairlines, or an image with irregularities drawn on a smooth plane may be pasted.

One end of the needle 61b, 62b is a base end serving as a rotation axis. The other end, which is a tip, rotates about the base end serving as the center of rotation. The needles 61b and 62b are arranged in a floating state from the dials 61a and 62a. Each of the speedometer 61 and the tachometer 62 described above is an example of a rotation needle meter that is a meter, in particular a meter with a dial and a needle having one end and other end rotating about the one end serving the rotation axis.

An illuminator 65 and a camera 66 are arranged in the virtual space 50 shown in FIG. 3. The illuminator 65 represents sunlight and corresponds to a virtual light source. The camera 66 represents the driver's viewpoint and line of sight. An image to be captured by the camera 66 is displayed with the display 10 as the display image. Accordingly, the camera 66 arranged in the virtual space 50 means the virtual viewpoint.

The measurement value acquirer 42 acquires measurement values to be indicated with the display target objects 60. In the example shown in FIG. 3, the display target objects 60 include the speedometer 61 and the tachometer 62. Therefore, the measurement value acquirer 42 acquires the vehicle speed and the engine rotation speed as the measurement values. These measurement values are acquired from sensors detecting the measurement values.

The driver information acquirer 43 acquires a position of the driver's viewpoint. The line-of-sight detector 30 successively detects the position of the driver's viewpoint. Thus, the driver information acquirer 43 successively acquires the position of the driver's viewpoint from the line-of-sight detector 30.

The drawing processor 45 successively generates the display image based on the image data acquired by the image data acquirer 41, the measurement values successively acquired by the measurement value acquirer 42, and the position of the driver's viewpoint successively acquired by the driver information acquirer 43. Then, the drawing processor 45 displays the generated display image with the display 10. The processing executed by the drawing processor 45 will be described with reference to the flowchart shown in FIG. 4.

Figure 4:
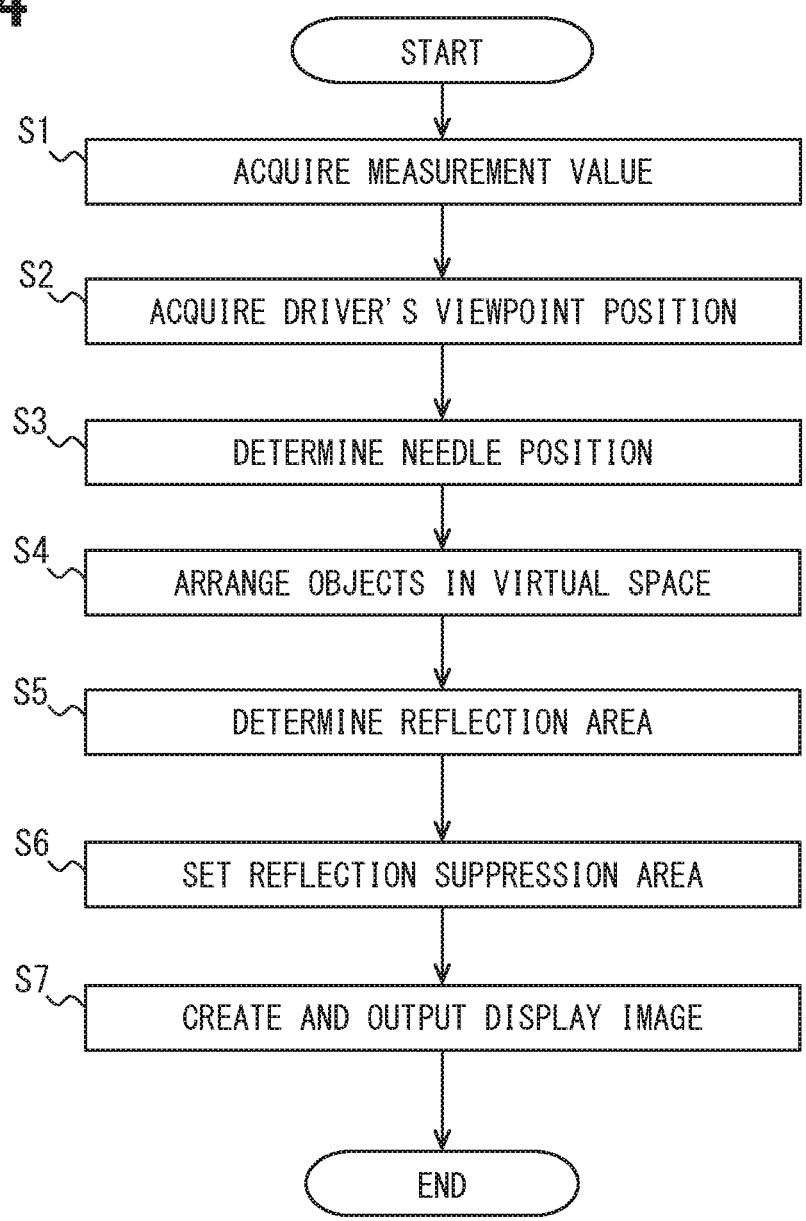
FIG. 4 is a flowchart illustrating processing executed by a drawing processor of FIG. 1.

After a condition for displaying a display image with the display 10 such as the turn on of the power of the vehicle 2 is met, the processing shown in FIG. 4 is cyclically performed in a state where the image data is acquired by the image data acquirer 41. In FIG. 4, step S1 (hereinafter, step is omitted) is a process executed by the measurement value acquirer 42. S2 is a process executed by the driver information acquirer 43. S3 and its subsequent steps are executed by the drawing processor 45.

In S1, the measurement values are acquired. In S2, the position of the driver's viewpoint is acquired. In S3, the position of the needle of the display target object 60 having the needle among the display target objects 60 arranged in the virtual space 50 is determined based on the measurement values acquired in S1.

In S4, the objects required to generate the display image displayed with the display 10 are arranged in the virtual space 50. Specifically, the objects arranged in the virtual space 50 are the display target objects 60, the illuminator 65, and the camera 66.

The position of the illuminator 65 represents the position of the Sun. In order to determine the position of the Sun, there is a prepared relationship for determining the position of Sun from a time point, a heading azimuth and a present location. The position of the illuminator 65 is determined using this relationship, the present time, the heading azimuth and the present location. The present location used is for example, the location detected by a GNSS receiver. The heading azimuth may be calculated from a trajectory to the present location. In the present embodiment, the amount of light illuminated by the illuminator 65 is constant. The position of the camera 66 is determined from the position of the driver's viewpoint acquired in S2.

In S5, a reflection area is set. The reflection area is an area on which the reflection resulting from the light illumination from the illuminator 65 when the display target object 60 is viewed from the position of the camera 66 is depicted.

Figure 5:
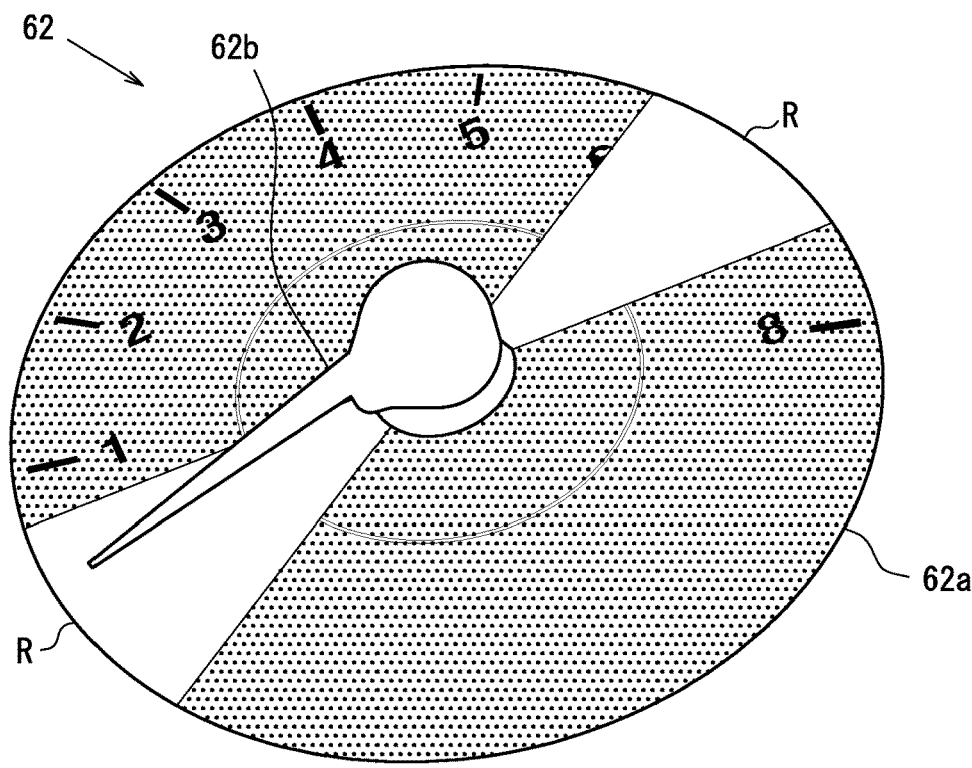
FIG. 5 is a diagram illustrating a reflection area depicted on a tachometer.

An example of this reflection area is shown in FIG. 5. FIG. 5 shows an example of the reflection area R provided to the tachometer 62. The whitened portion in FIG. 5 is the reflection area. As shown in FIG. 5, the reflection area in the rotation needle meter such as the tachometer 62 comprises two circular sectors symmetrical to each other with respect to a symmetric point that is at the center of the dial, The reflection area is an area that depicts the reflection resulting from the illumination of light from the illuminator 65. The specular reflectance is set so that the surface of the dial 62a exhibits metallic luster. For this reason, the reflection area shown in FIG. 5 is too bright, making it difficult to read the character on the dial 62a. This makes it difficult to see the value pointed to by the needle 62b. However, FIG. 5 is a diagram before setting a reflection suppression area described below, and is different from the display image actually generated.

As shown in FIG. 5, when the reflection area and the needle 62b overlap with each other, it is difficult to see the value pointed to by the needle 62b. In view of this, when the reflection area and the needle 62b overlap with each other, the process S6 described below is performed. In the above, a determination of whether or not the reflection area and the needle 62b overlap with each other is made based on a state where the needle 62b is viewed in a direction perpendicular to the dial 62a. Alternatively, the determination may be made based on the view from the camera 66. Similarly, in the case of the speedometer 61, when the reflection area and the needle 61b overlap with each other, the S6 process described below is performed.

In S6, the reflection suppression area is set to each of the dial 61a of the speedometer 61 and the dial 62a of the tachometer 62. The reflection suppression area is a circular sector shaped area, where the center of the circular sector is the base end of the needle 61b, 62b, and the center of the angle of the circular sector is the position pointed to by the needle 61b, 62b. Accordingly, the reflection suppression area covers places overlapping with the needle 61b, 62b. Moreover, because of the circular sector shape, the reflection suppression area is a partial area of the dial 61a, 62a.

Figure 6:
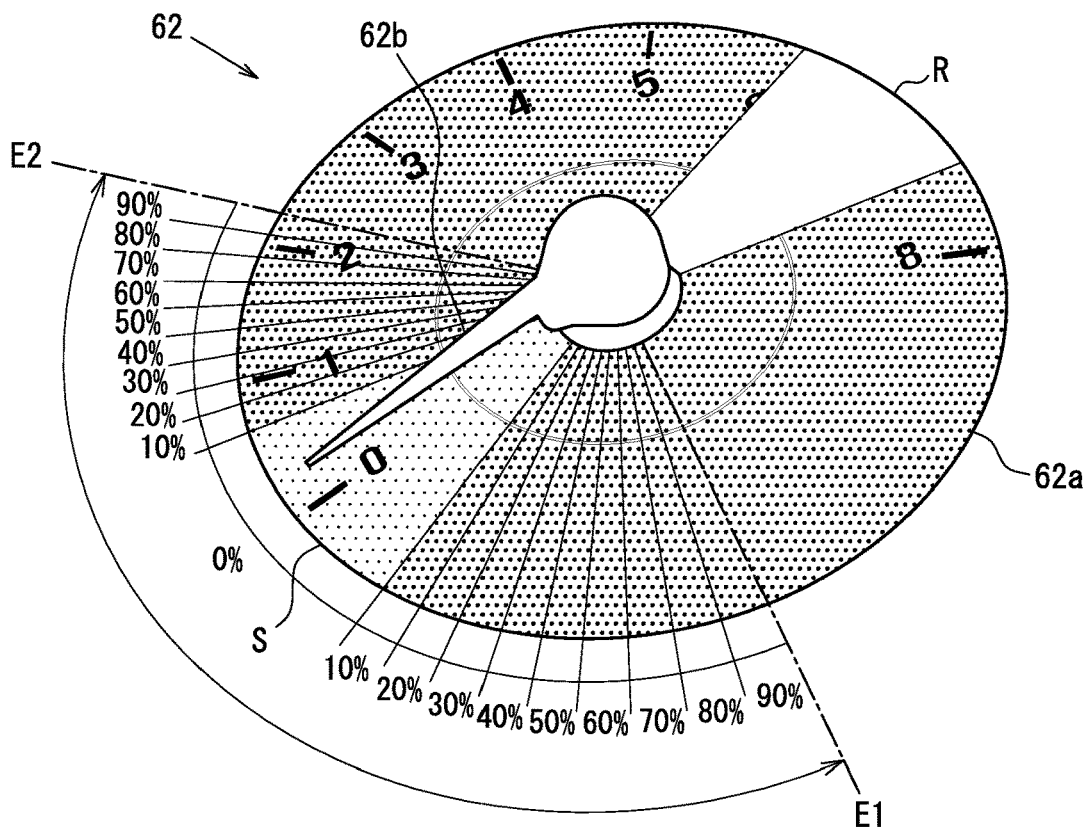
FIG. 6 is a diagram for explaining a reflection suppression area set to the tachometer.

FIG. 6 is a diagram for explanation on the reflection suppression area. In FIG. 6, the reflection suppression area S is a circular sector shaped area having the line E1 as one end and the line E2 as the other end, and the lines E1 and E2 intersect at the center of the dial 62a. The base end of the needle 62b is also at the center of the dial 62a. The central angle of the circular sector is a preset constant value.

The numerical values shown in percentage in FIG. 6 are coefficients α that are multiplied by the specular reflectance (i.e., the default specular reflectance) set for the dial 62a for metallic appearance. As shown in FIG. 6, the coefficient α is 0% at the center of the angle range of the reflection suppression area (hereinafter referred to as the angle range center). The angle range center corresponds to the position pointed to by the needle 62b. Further, the coefficient α increases in a stepwise manner, specifically increases by 10% at a respective step, from the angle range center toward the circumferential direction end. An angle range set for 0% and angle ranges set for other percentages are set in advance to constant values.

As the coefficient α is smaller, the product of the default specular reflectance set for the dial 62a and the coefficient α is smaller. This product is the specular reflectance actually used in depicting the dial 62a. Therefore, as the coefficient α is smaller, the specular reflectance used in actually depicting the dial 62a is smaller.

In FIG. 5, since the reflection area is white, it is difficult to read the character on the dial 62a near the tip of the needle 62b. However, as shown in FIG. 6, setting the reflection suppression area makes it easier to read the character on the dial 62a near the tip of the needle 62b.

In subsequent S7, an image of the display target object 60 viewed from the position of the camera 66 is generated. The generated image is the display image. After generating the display image, the display image is output to the display 10.

Summary of First Embodiment

In the vehicular display device 1 of the first embodiment, the drawing processor 45 sets the reflection area that depicts the reflection resulting from light illumination and the drawing processor 45 generates the display image being the image of the display target objects 60. The display target objects 60 include the speedometer 61 and the tachometer 62, and the reflection areas are also set to the dials 61a and 62a of these.

When a speedometer and a tachometer existing as three-dimensional objects are arranged to an instrument panel instead of displaying the speedometer 61 and the tachometer 62 with the display 10, the dials of these may be illuminated with sunlight. Therefore, by setting the reflection area to the dials 61a and 62a also as in the present embodiment, it is possible to depict the speedometer 61 and the tachometer 62 similar to the real things.

The dials 61a and 62a of this embodiment have metallic luster. Therefore, the reflection areas set to the dials 61a and 62a may become too bright, which may make it difficult to read the characters. When the needle 61b, 62b is located in the reflection area, it is difficult to see the numerical value pointed to by the needle 61b, 62b.

In view of this, when the needle 61b, 62b is in the reflection area, the drawing processor 45 sets the reflection suppression area to a part of the dial 61a, 62a so that the needle 61b, 62b is in the reflection suppression area.

The drawing processor 45 generates the display image through setting, to the reflection suppression area, the specular reflectance obtained by multiplying the coefficient α by the specular reflectance set for the dial 61a, 62a, where the coefficient α is smaller than 1. This makes it easier to read the character near the tip of the needle 61b, 62b, and as a result, it becomes easier to see the numerical values pointed to by the needle 61b, 62b.

In the present embodiment, from the place corresponding to the needle 61b, 62b, the coefficient α is larger as closer to the circumferential direction end of the reflection suppression area having the circular sector shape. Therefore, the specular reflectance set to the dial 61a and 62a when generating the display image is larger toward the circumferential direction end of the circular sector shaped reflection suppression area. As a result, it is possible to suppress a sudden brightness change between an inside and an outside the reflection area of the display image representing the speedometer 61 and the tachometer 62 displayed with the display 10.

Second Embodiment

Next, a second embodiment will be described. In the following description of the second embodiment, like references are used to refer to the same elements already described in the foregoing embodiment, unless otherwise specified. Additionally, when only a part of the configuration is described, the above-described embodiment is applicable to the other parts of the configuration.

Figure 7:
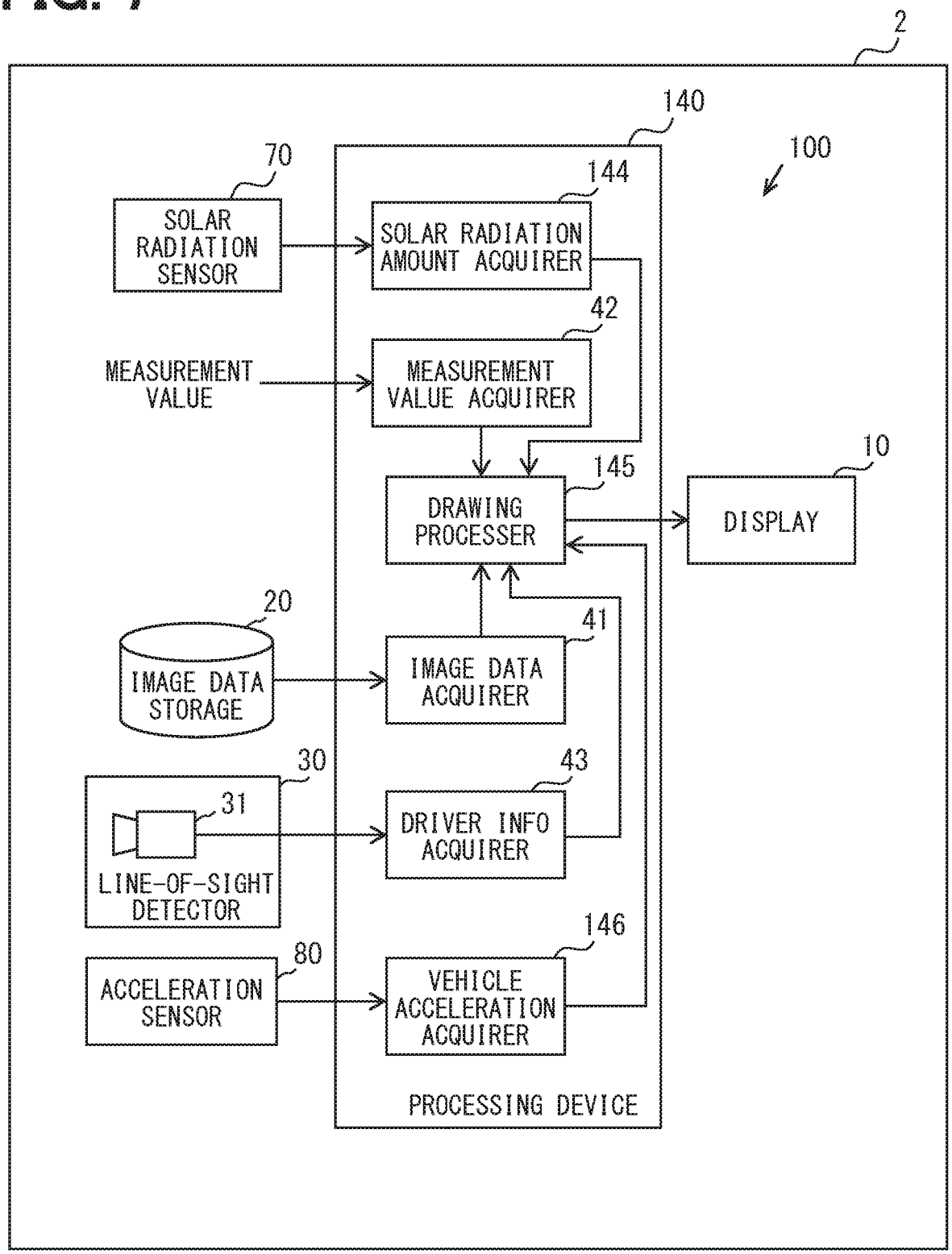
FIG. 7 is a block diagram illustrating a configuration of a vehicular display apparatus of a second embodiment.

FIG. 7 illustrates a configuration of the vehicular display apparatus 100 of the second embodiment. The vehicular display apparatus 100 includes a solar radiation sensor 70 and an acceleration sensor 80. A processing device 140 includes a solar radiation amount acquirer 144 and a vehicle acceleration acquirer 146, and includes a drawing processor 145 different from that in the first embodiment.

The solar radiation sensor 70 is installed on the dashboard of the vehicle 2 and may be at, for example, a place close to a front windshield, and detects the amount of solar radiation irradiated into the cabin of the vehicle 2. The acceleration sensor 80 is a triaxial acceleration sensor, and successively detects accelerations in a longitudinal direction, a width direction, and a vertical direction of the vehicle 2.

The solar radiation amount acquirer 144 acquires the solar radiation amount irradiated into the cabin of the vehicle 2. The solar radiation sensor 70 detects the solar radiation amount successively. Therefore, the solar radiation amount acquirer 144 successively acquires the solar radiation amount from the solar radiation sensor 70. The vehicle acceleration acquirer 146 successively acquires the acceleration of the vehicle 2 from the acceleration sensor 80. The acceleration acquired may be all three-axis accelerations, or two-axis accelerations except one-axis acceleration. Alternatively, only the uniaxial acceleration may be acquired.

The drawing processor 145 changes the amount of light of the illuminator 65 according to the solar radiation amount acquired by the solar radiation amount acquirer 144. Specifically, the amount of light of the illuminator 65 is increased with increasing solar radiation amount. Additionally, the drawing processor 145 sets the angle range of the reflection suppression area such that the angle range is larger as the acceleration acquired by the vehicle acceleration acquirer 146 is larger. Therefore, the larger the acceleration of the vehicle 2, the larger the reflection suppression area. The relationship between the acceleration and the size of the reflection suppression area is set as appropriate. For example, when the acceleration is the smallest, the angle range of the reflection suppression area is set to an angle range narrower than the angle range of the reflection area. Except for these processes, the drawing processor 145 executes the same processes as in the first embodiment.

Summary of Second Embodiment

In the second embodiment, the larger the acceleration of the vehicle 2, the larger the angle range of the reflection suppression area. The acceleration of the vehicle 2 is also transmitted to the driver who is driving the vehicle 2. Therefore, the larger the acceleration of the vehicle 2, the more the positions of the driver's eyes move and swing. The more the driver's eyes move and swing, the more difficult it is for the driver to see the poor visibility display content.

In view of this, in the present embodiment, the larger the acceleration of the vehicle 2, the larger the angle range of the reflection suppression area. Thereby, the low specular reflectance area near the needle 61b, 62b is larger as the acceleration of the vehicle 2 is larger. Accordingly, even if the acceleration of the vehicle 2 is large, it is possible to suppress the unreadability of the numerical value pointed to by the needle 61b, 62b.

Moreover, in the present embodiment, the light amount of the illuminator 65 is set based on the amount of solar radiation irradiated to the vehicle 2. As a result, when the amount of solar radiation is small, the brightness of the reflection area is adjusted accordingly.

The lower limit of the coefficient α may be set larger as the light amount of the illuminator 65 is smaller. As the light amount of the illuminator 65 is smaller, the brightness of the reflection area is low even if the specular reflectance is high. For this reason, even if the specular reflectance is high, readability of the characters displayed on the dials 61a and 62a is not deteriorated.

Third Embodiment

Figure 8:
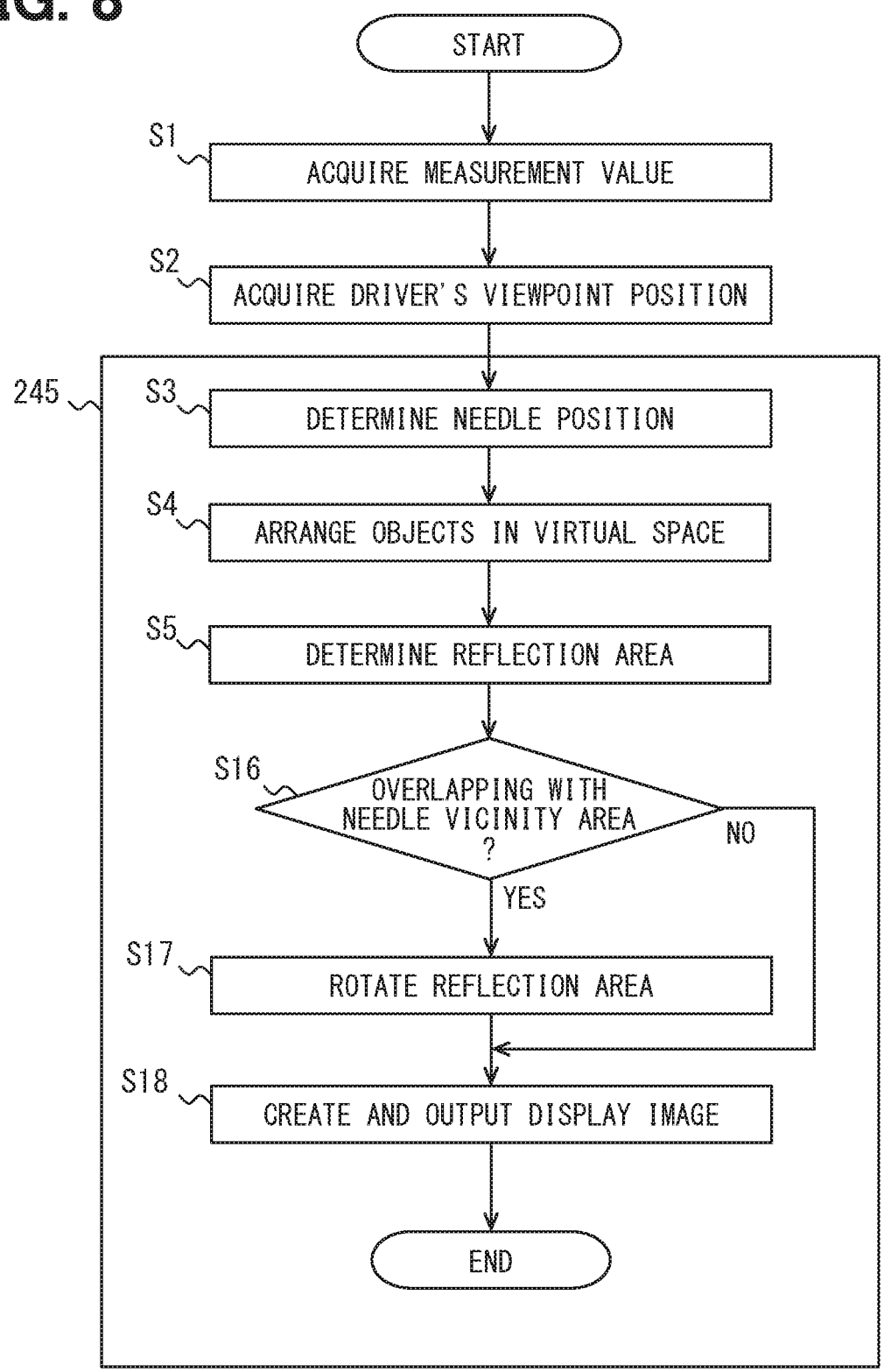
FIG. 8 is a flowchart illustrating processing of a drawing processor of a third embodiment.

FIG. 8 illustrates processing executed by a drawing processor 245 of a third embodiment. The vehicular display apparatus of the third embodiment is the same as that of the first embodiment except for the processing of the drawing processor 245.

S1, S2, S3, and S4 in FIG. 8 are the same processes as those shown in FIG. 1. In S5 also, the reflection area is determined based on the position of the illuminator 65 serving as the virtual light source and the position of the camera 66 serving as the virtual viewpoint, as in the process shown in FIG. 4. In the third embodiment however, depending on the determination result of subsequent S16, the reflection area is rotated.

In S16, a determination of whether or not the reflection area determined in S15 overlaps at least in part with a needle vicinity area is made. The needle vicinity area is an area centered on the needle 61b, 62b and has a circular sector shape as is the case of the reflection area. The value of the central angle of the needle vicinity area is appropriately determined from the viewpoint of visibility. As the central angle of the needle vicinity area is larger, it is rare that the reflection area is set around the needles 61b and 62b. Therefore, the larger the central angle of the needle vicinity area is, the easier it is to read the numerical value pointed to by the needle 61b, 62b. If the determination in S16 results in NO, the process proceeds directly to S18. When the determination in S16 results in YES, the process proceeds to S18 after execution of S17.

In S17, the reflection area is rotated to a position where the reflection area does not overlap with the needle vicinity area, where the center of rotation is the center of the dial 61a, 62a. For example, the position is a position where the needle vicinity area and the reflection area are separated by an angle β. This angle β is a constant value, and is set to 5 degrees, for example. The angle β may be 0 degrees.

Figure 9:
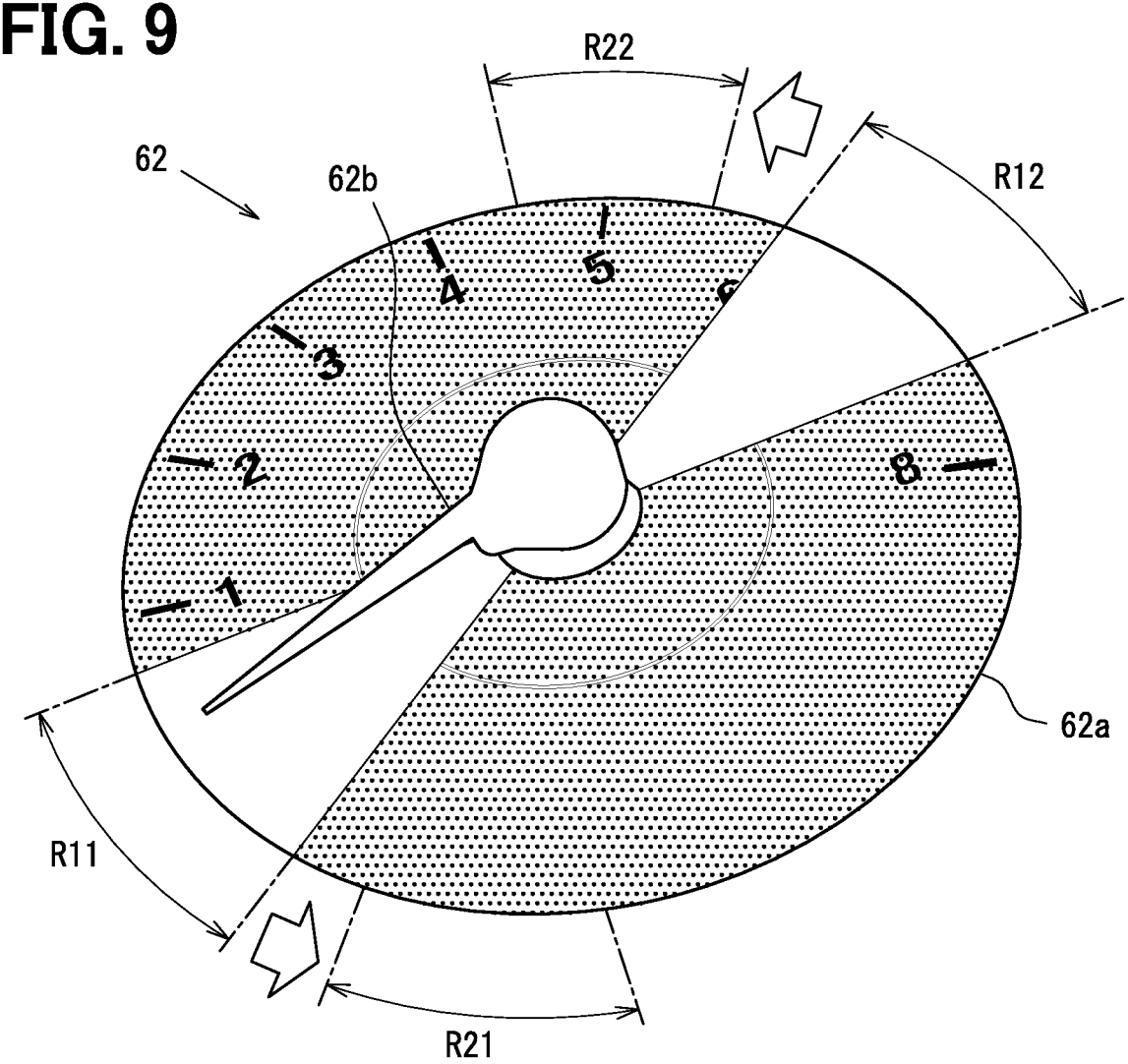
FIG. 9 is a diagram illustrating a reflection area before and after rotation.

FIG. 9 conceptually illustrates the process of rotating the reflection area. The angle ranges R11 and R12 are the angle ranges of the reflection areas determined in S5. Since the needle 62b is in the angle range R11, the angle range R11 and the needle vicinity area overlap with each other at least in part. Therefore, the determination in S16 results in YES. In the example of FIG. 9, the angle range R21 is the angle range of the reflection area after the rotation of the angle range R11, and the angle range R22 is the angle range of the reflection area after the rotation of the angle range R12.

In S18, an image of the display target object 60 viewed from the position of the camera 60 is generated as the display image, and the display image is output to the display 10.

Summary of Third Embodiment

The drawing processor 245 sets the reflection areas to the speedometer 61 and the tachometer 62 and generates the display image. Therefore, it is possible to depict the speedometer 61 and the tachometer 62 similar to the real things.

In addition, when the reflection area overlaps at least in part with the needle vicinity area, the drawing processor 245 sets the reflection area to a position displaced from the needle vicinity area. Accordingly, it is possible to suppress unreadability of the numerical values pointed to by the needles 61b and 62b.

First Modification

In the above-described embodiments, the speedometer 61 and the tachometer 62 provided as the rotation needle meters are illustrated as the display target objects 60. However, an instrument in which the needle moves linearly may be used as the display target object 60. In the case of the instrument in which the needle moves linearly, the reflection suppression area and the needle vicinity area may be rectangular areas covering the needle. Examples of the instrument in which the needle moves linearly include a water temperature gauge and a fuel gauge. For the instrument in which the needle moves linearly, the coefficient α may be set such that the coefficient is larger in a stepwise manner as closer to the outside of the reflection suppression area, that is, as closer to the area other than the reflection suppression area on the dial.

It is noted that the reflection suppression area or the needle vicinity area may set to not all of the instruments provided as the display target objects 60. The reflection suppression area or the needle vicinity area may be set only to such instruments as the speedometer 61 and the tachometer 62 in which the needle moves intensely.

Second Modification

In the embodiments described above, the position of the illuminator 65 represents the position of the Sun, and the position of the Sun is determined from the time, the heading direction, and the present position. Alternatively, the position of the Sun may be moved at fixed periods. Alternatively, the position of the Sun may be fixed. The illuminator 65 may be at a position of artificial light. An example of the artificial light is a room light installed in the vehicle 2. Alternatively, the position of the illuminator 65 may be the position of the Sun during the daytime, and may be the position of the room light during the night time.

Third Modification

In the embodiments described above, the position of the camera 66 is the position of the driver's viewpoint. However, this is not limiting. The position of the camera 66 may be determined based on the position of the driver's head. The position of the camera 66 may be a fixed position.

Fourth Modification

In the first embodiment, the reflection suppression area is set when the reflection area and the needle 61b, 62b overlap with each other. Alternatively, regardless of whether or not the reflection area and the needle 61b, 62b overlap with each other, the reflection suppression area may be set at all times.

Fifth Modification

In the above-described embodiments, the coefficient α increases with increasing distance from the needle 61b, 62b. Alternatively, the value of the coefficient α may be constant regardless of the position relative to the needle 61b, 62b. In the above-described embodiments, the reflection suppression area is larger than the reflection area. Alternatively, the reflection area as it is may be used as the reflection suppression area.

Although the present disclosure has been described in accordance with the embodiments, it is to be understood that the present disclosure is not limited to the embodiments and the structures. The present disclosure covers various modification examples and modifications within equivalent ranges. In addition, although various combinations and forms have been illustrated in the present disclosure, other combinations and forms, including only a single element, more or less elements, are also included in the scope and spirit of the present disclosure.

The invention claimed is:

1. A vehicular display apparatus comprising:
a display unit that is installed in a vehicle; and
a processor configured to
acquire image data of a display target object for generating a display image with the display unit;
arrange the display target object in a virtual space based on the acquired image data;
arrange a virtual light source and a virtual viewpoint in the virtual space;
generate, as the display image, an image of the display target object viewed from the virtual viewpoint; and
display the display image with the display unit, wherein
the display target object includes an instrument with a needle and a dial, and
the processor generates the display image through:
setting an area on the display target object determined based on the virtual light source and the virtual viewpoint, as a reflection area depicting reflection resulting from light illumination; and
setting a reflectance of a reflection suppression area to be smaller than a reflectance set for the dial, wherein the reflection suppression area is a partial area of the dial and is set to cover places overlapping with the needle,
the reflection suppression area depicts the reflection resulting from the light illumination,
the depicted reflection in the reflection suppression area is smaller than the depicted reflection in the reflection area,
the reflectance of at least part of the reflection suppression area is larger than zero,
the reflection suppression area is a circular sector shape on the dial bounded by a first radius extending from a center of the dial to an edge of the dial, a second radius extending from the center of the dial to the edge of the dial, and the edge of the dial,
the reflection suppression area is further subdivided into a plurality of circular sector-shaped regions with (i) a central region disposed between the first radius and the second radius and (ii) a remainder of the plurality of circular-sector-shaped regions disposed between the central region and the first radius and the central region and the second radius, and
the reflection suppression area has a range of coefficients of specular reflectance, with a lowest value of a coefficient of specular reflectance being in the central region, and values of the coefficients of specular reflectance increasing from the lowest value (i) in a direction from the central region toward the first radius, and (ii) in a direction from the central region toward the second radius.

2. The vehicular display apparatus according to claim 1, wherein
the processor is further configured to set the reflection suppression area when the reflection area and the needle overlap with each other.

3. The vehicular display apparatus according to claim 1, wherein
the display target object includes a rotation needle meter with the dial and the needle,
a one end of the needle is a rotation axis about which the other end of the needle rotates, and
the processor is further configured to set each of the reflection area and the reflection suppression area of the rotation needle meter to a circular sector shape, and to set the reflectance of the reflection suppression area such that the reflectance of the reflection suppression area is larger as closer to a circumferential direction end of the circular sector shape of the reflection suppression area.

4. The vehicular display apparatus according to claim 1, wherein
the processor is further configured to increase the reflection suppression area in response to an increase in an acceleration of the vehicle.

5. The vehicular display apparatus according to claim 1, wherein the processor is further configured to set a specular reflectance for the dial to exhibit a metallic luster.

6. The vehicular display apparatus according to claim 1, wherein the processor is further configured to set a specular reflectance of the reflection suppression area to be smaller than a specular reflectance set for the dial.

7. The vehicular display apparatus according to claim 6, wherein the specular reflectance of at least part of the reflection suppression area is larger than zero.

* * * * *